United States Patent [19]
Popoff et al.

[11] 4,226,948
[45] Oct. 7, 1980

[54] 2-TRICHLOROMETHYLOXAZOLIDINE AND THIAZOLIDINE DERIVATIVES USEFUL AS FLAME RETARDANTS FOR POLYURETHANE FOAM

[75] Inventors: Ivan C. Popoff, Ambler; Stanley R. Sandler, Springfield, both of Pa.

[73] Assignee: Pennwalt Corporation, Philadelphia, Pa.

[21] Appl. No.: 1,626

[22] Filed: Jan. 8, 1979

[51] Int. Cl.$^2$ .................... C08G 18/38; C08G 18/32; C08G 18/14
[52] U.S. Cl. .................... 521/167; 260/45.8 NZ; 260/45.8 SN; 521/903; 521/115; 521/121; 521/129; 548/146; 548/215
[58] Field of Search ............... 260/307 FA, 307.5 R, 260/45.8 N, 45.8 RW, 45.8 NZ, 45.8 A, 45.8 SN; 521/121, 903, 129, 167, 115

[56] References Cited

U.S. PATENT DOCUMENTS

| | | | |
|---|---|---|---|
| 3,741,921 | 6/1973 | Lapkin | 521/171 |
| 3,905,928 | 9/1975 | Sidi et al. | 260/45.8 NZ |
| 3,914,189 | 10/1975 | Rudner et al. | 521/128 |
| 3,933,694 | 1/1976 | Wysocki | 521/121 |
| 4,012,261 | 3/1977 | Sidi et al. | 260/45.8 NZ |

*Primary Examiner*—H. S. Cockeram

[57] ABSTRACT

A rigid polyurethane foam is prepared from a reaction mixture incorporating therein a 2-trichloromethyloxazolidine or a thiazolidine derivative for imparting to the foam smoke and flame retardancy.

4 Claims, No Drawings

2-TRICHLOROMETHYLOXAZOLIDINE AND THIAZOLIDINE DERIVATIVES USEFUL AS FLAME RETARDANTS FOR POLYURETHANE FOAM

BACKGROUND OF THE INVENTION

This invention relates to flame-and smoke-retardant rigid polyurethane foam, and more particularly to 2-trichloromethyl-1, 3-oxazolidine, 2-trichloromethyl-1, 3-thiazolidine and derivatives thereof which are especially useful in retarding smoke and flames in rigid polyurethane foams.

Rigid polyurethane foams are becoming increasingly important as an insulation material in construction of new buildings to reduce energy losses. Building code regulations now require that these foams be not only flame retardant but also have low-smoke properties in order to make escape exits more easily observable by the occupants and to allow easy access by firemen. The prior art discloses the use of chlorinated compounds as flame retardants such as trichlorobutylene oxide for rigid polyurethane foam but these compounds have the disadvantage of generating too much smoke on combustion of the foam. (See U.S. Pat. No. 3,741,921). The flame and smoke retardants of this invention overcome the disadvantages of the prior art because they generate less smoke on combustion.

STATEMENT OF THE INVENTION

The present invention is directed to a rigid polyurethane foam prepared from a reaction mixture which comprises a smoke and flame retarding amount of a compound selected from the group consisting of

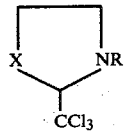

where
(a) X is O or S; and
(b) R is selected from the group consisting of H,

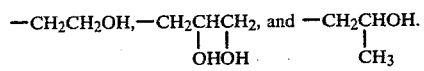

DETAILED DESCRIPTION OF THE INVENTION

A variety of rigid polyurethanes can be used in this invention. Some typical examples are described in E. N. Doyle "The Development and Use of Polyurethane Products." McGraw Hill Book Company, New York, 1971, and in W. C. Kuryla and A. J. Papa "Flame Retardancy of Polymers Materials" Volume 3, Marcel Dekker, Inc., New York, 1975; these references are hereby incorporated herein and should be considered as a part of this disclosure. In general, the flame-and smoke-retardant rigid polyurethanes are prepared by adding 1 to 30 parts by weight of the retardant to the reactants, i.e., polyols, surfactants, catalyst, water, blowing agents, and isocyanate, to produce the rigid polyurethane foam.

The preferred flame retardants for use in the instant invention are 2-trichloromethyl-1, 3-oxazolidine, 2-trichloromethyl-1, 3-thiazolidine, 3-(2-hydroxyethyl)-2-trichloromethyl-1, 3-thiazolidine, 3-(2-hydroxyethyl)-2-trichloromethyl-1, 3-oxazolidine, 3-(2-hydroxypropyl)-2-trichloromethyl-1, 3-oxazolidine, and 3-(2,3-dihydroxypropyl)-2-trichloromethyl-1, 3-oxazolidine.

In the following examples the foams are prepared by mixing the ingredients and adding the mix to a mold of the dimensions 8×8×5 inches. The foam is first aged for 7 days and then cut into 3×3×1-inch specimens that are burned in the NBS Smoke Chamber using the flaming mold in accordance with ASTM special technical publication 422 (1969) and NFPA 258-T "Smoke Generated by Solid Materials" May, 1974. Flame retardancy was measured by ASTM D-1692 test which involves burning a 2×5×½-inch sample horizontally in a draft-free hood with a propane flame. Samples burning the entire length are not considered flame-retarded. The values are reported in inches burned. The average of two or more values is reported.

The following examples merely illustrate the present invention but are not intended to limit the invention thereto.

EXAMPLE 1

2-Trichloromethyl-1, 3-oxazolidine

To a 2 liter 3-necked flask equipped with a stirrer, Dean-Stark trap, a condenser and dropping funnel were added 214 g (3.51 moles) ethanolamine and 450 g. toluene. Then 273 g (4.55 moles) of glacial acetic acid were added slowly to keep the temperature (cooling if necessary) at 30°–45° C. Then 568 g (3.85 moles) of chloral were added at 40°–50° C. The reaction mixture was refluxed to remove water and, when complete, the temperature increased to 115°–120° C. The reaction mixture was cooled in an ice bath and the product precipitated after standing for several hours to give 189.5 g (28.5%) m.p. 72°–74° C. The filtrate was washed with 5.0 moles of 20% sodium hydroxide and more product precipitated. Filtration and drying yielded 228.5 g (34.3%), m.p. 73°–75° C. The toluene layer was washed with water and evaporated to give a solid. Washing with water and filtration yielded upon drying 328 g. (49.2%), m.p. 62°–72° C. for a total yield of 556.0 g (83.5%). The analysis was consistent with the assigned structure.

The composition of Example 1 may be reacted with epichlorohydrin or other oxiranes (ethylene oxide, propylene oxide) to give the hydroxy containing derivatives of this invention which are useful as flame retardants.

EXAMPLE 2

3-(2-Hydroxyethyl)-2-Trichloromethyl-1, 3-Oxazolidine

One mole of the composition of Example 1 was reacted with 1.1 moles of ethylene oxide under pressure to give 3-(2-hydroxyethyl)-2-trichloromethyl-1, 3-oxazolidine which analyzed well for the assigned structure. The analogous thiazolidine compound is prepared in a similar manner.

| Examples 3–5 | |
|---|---|
| Foam Formulation: | Parts |
| Polyol (Poly G-71-530 Olin) | 100.0 |

| Examples 3–5 | | | |
|---|---|---|---|
| Surfactant (DC-193-Dow Corning) | | | 1.5 |
| Water | | | 0.5 |
| Catalyst (Penncat 283-Pennwalt) | | | 3.0 |
| Blowing Agent (Pennwalt's Isotron-11) | | | 50.0 |
| Flame Retardant | | | as shown |
| Polyisocyanate (PAPI-UpJohn) | | | as shown |
| | Ex. 3 | Ex. 4 | Ex. 5 |
| Flame Retardant (php)[a] | none | Thermolin RF230[b] (25) | Comp. of Ex. 1 (22) |
| PAPI (parts by wt.) | 153 | 140 | 153 |
| NBS-Maximum Smoke Density (corrected) | 138 | 166 | 127 |
| ASTM D-1692 (inches of burn) | 2.0 | 1.25 | 0.78 |

[a]php = parts per hundred parts of polyol.
[b]a trademark for trichlorobutylene oxide polyol marketed by Olin Corporation.

Examples 3–5 show in a comparison that when no flame retardant is used the foam strip burns completely (Example 3); when a prior art composition is used (Example 4), the inches of burning are only slightly less than the control; and when the composition of this invention is used (Example 5), the inches burned are substantially reduced. Furthermore, note that the maximum smoke density for Example 5 is also significantly less than in Examples 3 and 4.

EXAMPLE 6

To the formulation shown in Examples 3–5 was added 22.5 php of 3-phenylsulfonyl-2-trichloromethyl-1, 3-oxazolidine. The sample burned the entire length in the ASTM D 1692 test and the smoke density was similar to that of Example 5. This example demonstrates that not all oxazolidines give acceptable flame retardancy rating nor come within the scope of this invention.

EXAMPLE 7

To the formulation shown in Examples 3–5 was added 17 php of 3-formyl-2-trichloromethyl-1, 3-oxazolidine. The sample burned the entire length in the ASTM D 1692 test and the smoke density was similar to that of Example 5. This is another substituted oxazolidine not within the scope of this invention that does not produce acceptable flame retardancy rating.

EXAMPLE 8

To the formulation in Examples 3–5 was added 30 php of 3-(2-hydroxyethyl)-2-trichloromethyl-1, 3-oxazolidine (Example 2) followed later by 171 parts PAPI. The flame and smoke density results were equivalent to Example 5.

EXAMPLE 9

3-(2-Hydroxypropyl)-2-Trichloromethyl-1, 3-Oxazolidine

To a three-necked flask equipped with a mechanical stirrer, Dry Ice condenser, addition funnel and thermometer were charged 191 g (1.0 mole) of 2-trichloromethyloxazolidine, 400 g. toluene and 1 ml of triethylamine. Then 64 g (1.1 mole) of propylene oxide was added and the temperature raised to 55° C. The reaction was over when the propylene oxide stopped refluxing. The reaction mixture was then concentrated under reduced pressure to yield the product. The analysis was consistent with the assigned structure. The analogous thiazolidine is prepared in a similar manner.

EXAMPLE 10

To the formulation in Examples 3–5 was added 31 php of 3-(2-hydroxypropyl)-2-trichloromethyl-1, 3-oxazolidine (Example 9) followed later by 171 parts PAPI. The flame and smoke density results were equivalent to that of Example 5.

EXAMPLE 11

3-(2,3-Dihydroxypropyl)-2-Trichloromethyl-1,3-Oxazolidine

To a three-necked flask equipped with a mechanical stirrer, condenser, addition funnel and thermometer were charged 191 g (1.0 mole) of 2-trichloromethyloxazolidine, 101 g (1.0 mole) of triethylamine and 400 g of tetrahydrofuran. Then 93 g (1.0 mole) of epichlorohydrin was slowly added while heating the reaction mixture to 66° C. After the reaction was complete, the precipitate of triethylamine hydrochloride was filtered and the filtrate added to a flask containing 100 ml of 10% aqueous triethylamine solution. The reaction mixture was gently refluxed for 3 hours and the product isolated by removing the volatiles under reduced pressure. The analysis was consistent with the assigned structure. The analogous thiazolidine is prepared in a similar manner.

EXAMPLE 12

To the formulation in Examples 3–5 was added 35 php of 3-(2,3-dihydroxypropyl)-2-trichloromethyl-1, 3-oxazolidine (Example 11) followed later by 174 parts PAPI. The flame and smoke density results were equivalent to that of Example 5.

EXAMPLE 13

To the formulation in Examples 3–5 was added 24 php of 2-trichloromethyl-1, 3-thiazolidine followed later by 153 parts PAPI. The flame and smoke density results were equivalent to that of Example 5.

What is claimed:

1. A rigid polyurethane foam prepared from a reaction mixture which comprises a flame retarding amount of a compound selected from the group consisting of:

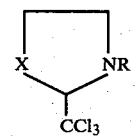

where
(a) X is O or S and
(b) R is selected from the group consisting of H,

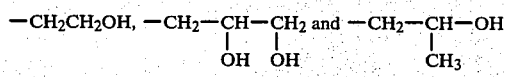

wherein the resulting foam not only has flame retardant properties but also has smoke suppressant properties.

2. The rigid polyurethane foam of claim 1 wherein the flame retardant is selected from the group 2-trichloromethyl-1, 3-oxazolidine, 2-trichloromethyl-1, 3-thiazolidine, 3-(2-hydroxyethyl)-2-trichlormethyl-1, 3-thiazolidine, 3-(2-hydroxyethyl)-2-trichloromethyl-1,3-oxazolidine and 3-(2,3-dihydroxypropyl)-2-trichloromethyl-1, 3-oxazolidine.

3. The rigid polyurethane foam of claim 1 wherein the flame retarding amount of the compound is 1 to 30 parts by weight of the foam.

4. A rigid polyurethane foam of claim 1 wherein the low-smoke producing flame retardant is 2-trichlormethyl-1, 3-oxazolidine.

* * * * *